Patented Nov. 4, 1952

2,616,890

UNITED STATES PATENT OFFICE 2,616,890

HALOGENATED OLEFIN PYRIDINE DERIVATIVES

James M. Smith, Jr., North Plainfield, N. J., assignor to American Cyanamid Company, New York, N. Y., a corporation of Maine No Drawing. Application June 18, 1949, Serial No. 100,099

3 Claims. (Cl. 260—240)

This invention relates to new organic compounds, and more particularly to chloro-styryl pyridines. This application is a continuation-in-part of my applications Serial No. 724,237 filed January 24, 1947, now U. S. Patent 2,482,521, issued September 20, 1949 and Serial No. 725,733, filed January 31, 1947, now U. S. Patent 2,512,180, issued June 20, 1950 which are both continuations-in-part of my Serial No. 598,627, filed June 9, 1945 and now U. S. Patent No. 2,442,865, issued June 8, 1948.

The new compounds of the present invention have the following formula

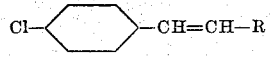

in which R is a pyridine or quinoline radical.

These chloro products are useful as therapeutic agents since they possess anti-convulsant properties, and are also intermediates in the preparation of the compounds described in my U. S. Patents 2,482,521 and 2,512,180 and other useful organic compounds.

The compounds are white to pale yellow crystalline solids and are generally soluble in organic solvents such as alcohol. The acid salts of the compounds are water-soluble.

The preferred synthesis of the products of my invention is that in which p-chlorobenzaldehyde is condensed with a methyl pyridine or quinoline. The reaction is carried out at elevated temperatures in the range 50–250° C. A reaction period of from 2–20 hours is sufficient to assure adequate yields in most cases.

When the chloro-styryl pyridine derivatives are being prepared convenient starting materials are para-chlorobenzaldehyde and alpha- or gamma-picoline. When the analogous quinoline derivatives are being prepared, lepidine or quinaldine are used as raw materials.

The chloro-styryl heterocycle derivatives are isolated as the free bases or as acid salts, preferably the hydrochloride. Recrystallization of the acid salts from water offers a convenient method of purification. The free bases are generally soluble in organic solvents such as benzene, diethyl ether, isopropyl acetate and the like, and in aqueous acids, but are insoluble in water or aqueous solutions of alkalis. The acid salts are soluble in water and aqueous solutions of acids and alcohols, but are insoluble in organic solvents such as ether, benzene, isopropyl acetate, etc.

The invention will now be illustrated but not limited by the following examples. Unless otherwise stated, all parts are by weight.

EXAMPLE 1

*1-(p-chlorophenyl)-2-(2-pyridyl) ethylene*

A mixture of 1500 parts of p-chlorobenzaldehyde, 990 parts of alpha-picoline, and 1088 parts of acetic anhydride are heated under reflux in an atmosphere of nitrogen for 18 hours. Low boiling products and unreacted ingredients are then removed by vacuum distillation until approximately 1500 parts of distillate are obtained. The residue is poured into several volumes of cold water resulting in the precipitation of a brown crystalline solid which is isolated by filtration. This is dissolved in an excess of 2N hydrochloric acid and extracted with ether or benzene to remove impurities. The acid solution is then neutralized with caustic, and the resulting precipitate filtered off, washed with water and dried. The yield of crude 1-(p-chlorophenyl - 2 - (2 - pyridyl) ethylene is approximately 1245 parts. Purification of the product may be accomplished by recrystallization of the base or its hydrochloride from a suitable organic solvent such as alcohol, with the aid of decolorizing charcoal, or by vacuum distillation of the base which boils at 173–180° C./5–7 mm. The purified base melts at 83–84° C. and the hydrochloride melts at 193–195° C.

EXAMPLE 2

*1-(p-chlorophenyl)-2-(4-pyridyl) ethylene*

A mixture of 600 parts of p-chlorobenzaldehyde, 396 parts of α-picoline and 435 parts of acetic anhydride are heated to reflux in an atmosphere of nitrogen for 6 hours. On heating, a crystalline mass is formed which is drowned in several volumes of water and filtered. The filter cake is dissolved in an excess of warm dilute hydrochloric acid and refiltered to remove the small amount of insoluble material. On cooling to 10° C. a heavy precipitate is formed which is filtered off and then slurried in acetone to remove dark colored impurities. On refiltering and drying, approximately 671 parts of 1-(p-chlorophenyl)-2-(4-pyridyl) ethylene hydrochloride is obtained which is a yellow product melting at 248–250° C. The free base prepared by neutralizing an aqueous solution of the hydrochloride with caustic melts at approximately 110° C.

EXAMPLE 3

*2-(p-chlorophenyl)-2-(2-quinolyl) ethylene*

A mixture of 760 parts of quinaldine, 530 parts of p-chlorobenzaldehyde and 357 parts acetic anhydride are boiled under reflux for 2½ hours under a nitrogen atmosphere. The solution is allowed to cool, whereupon it solidifies. After 16 hours it is melted and poured into an ice and water mixture to give a total volume of 4000 parts. The crude product is collected on the filter and washed until the wash-water is acid free. The filtrate is then extracted with 6300 parts of boiling alcohol containing a small amount of activated carbon. The alcohol extract, on filtering and cooling, deposits a yellow crystalline product which is collected on the filter, washed with cool alcohol and dried. The filtrate and washings are used to extract the crude residue 3 times more in a similar fashion. The total recovery is 654 parts. A sample of the base recrystallized from boiling alcohol then melted at 142.8–143.2° C.

EXAMPLE 4

*1-(p-chlorophenyl)-2-(4-quinolyl) ethylene*

A mixture of 702.5 parts of p-chlorobenzaldehyde, 770 parts of lepidine and 510 parts of acetic anhydride was refluxed for 10 hours. It was then cooled, poured into water, and the water decanted from the resultant crystalline mass. The latter was recrystallized from boiling ethanol to give 625. parts of the product melting at 126.0–127.3° C. After repeated recrystallization from ethanol including decolorization with activated charcoal, the product melted at 127.0–128.1° C.

I claim:

1. Compounds of the formula

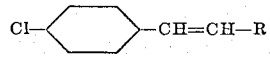

where R is a pyridine radical.
2. 4-(4-chlorostyryl) pyridine.
3. 2(4-chlorostyryl) pyridine.

JAMES M. SMITH, Jr.

REFERENCES CITED

The following references are of record in the file of this patent:

UNITED STATES PATENTS

| Number | Name | Date |
|---|---|---|
| 2,028,141 | Ackerman | Jan. 21, 1936 |
| 2,255,077 | Middleton | Sept. 9, 1941 |
| 2,388,499 | Ruthof | Nov. 6, 1945 |
| 2,427,286 | Knapp | Sept. 9, 1947 |